United States Patent [19]
Waltower

[11] 3,867,823
[45] Feb. 25, 1975

[54] KEY CASE

[76] Inventor: Napoleon Waltower, 12471 Grand River, Detroit, Mich. 48204

[22] Filed: Oct. 9, 1973

[21] Appl. No.: 404,168

[52] U.S. Cl. ................................. 70/456 B, 70/63
[51] Int. Cl. ............................................ A47g 29/10
[58] Field of Search .......... 70/14, 63, 456 R, 456 B, 70/459; 150/40; 24/3 K

[56] References Cited
UNITED STATES PATENTS

| | | | |
|---|---|---|---|
| 1,943,319 | 11/1933 | Newbauer | 70/14 |
| 2,672,043 | 3/1954 | Folscheid | 70/456 R X |
| 3,786,656 | 1/1974 | Suprowich | 70/63 |

*Primary Examiner*—Robert L. Wolfe
*Attorney, Agent, or Firm*—Whittemore, Hulbert & Belknap

[57] ABSTRACT

A key case including structure for securing keys to the key case so that they extend alternatively outside or inside the key case, which key case has a multiple-digit combination lock, and the method of use of the key case whereby when a person in control of an automobile, the keys to which are secured to the key case, decides that his facilties may become impaired, he places the automobile keys so that they extend into the key case and locks the key case with the combination lock, whereby if the faculties of the person become impaired to the point where he is unable to dial the combination of the combination lock and should, therefore, not be driving an automobile, he will be unable to get to the automobile keys and therefore be unable to drive the automobile in his impaired condition.

7 Claims, 4 Drawing Figures

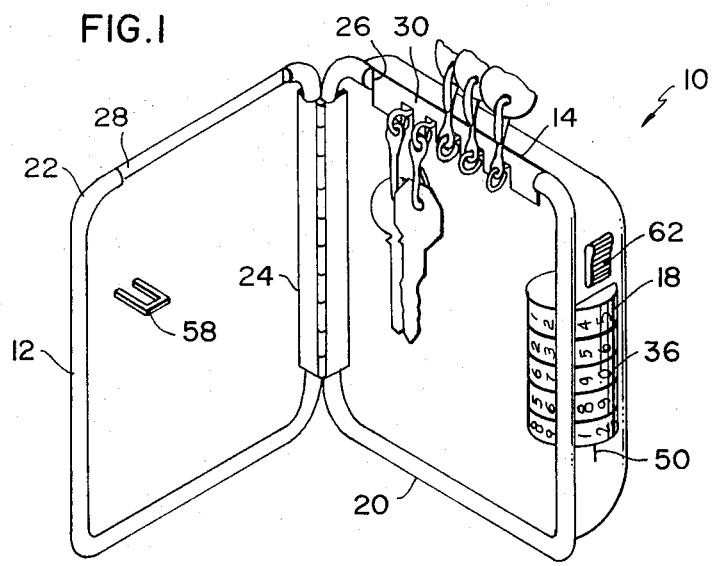
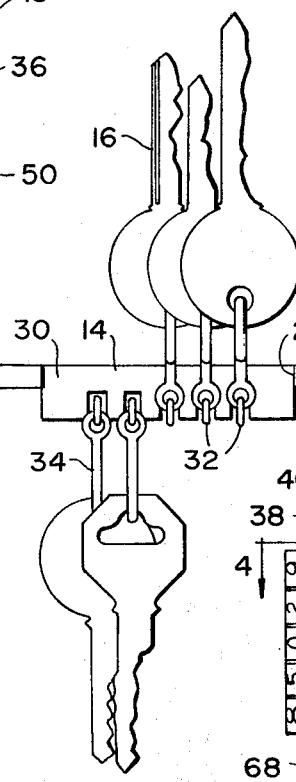
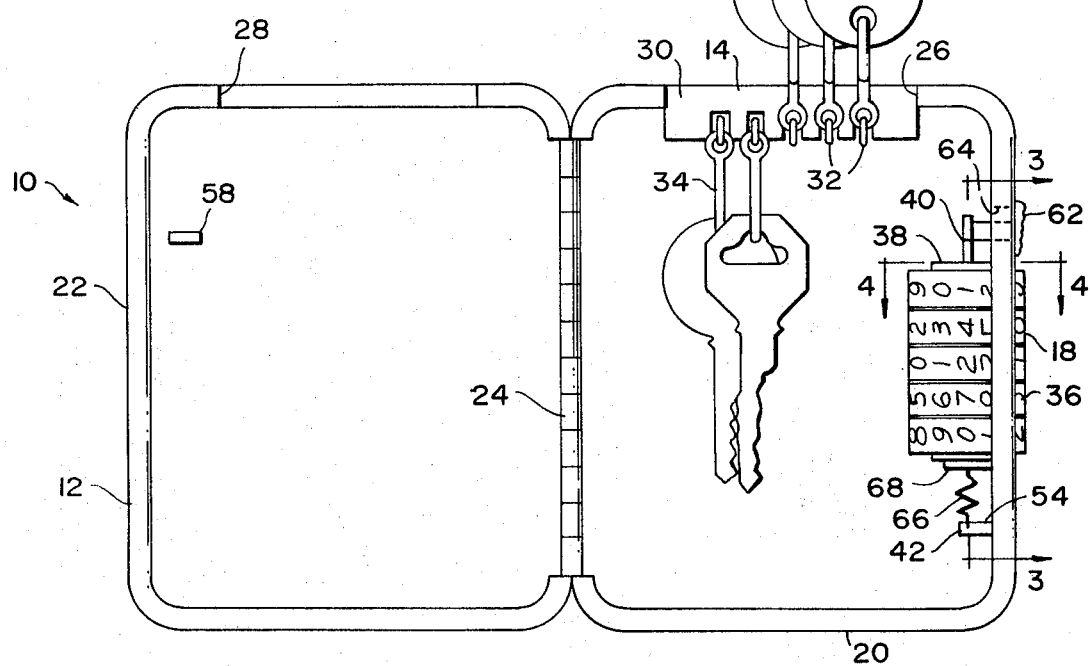
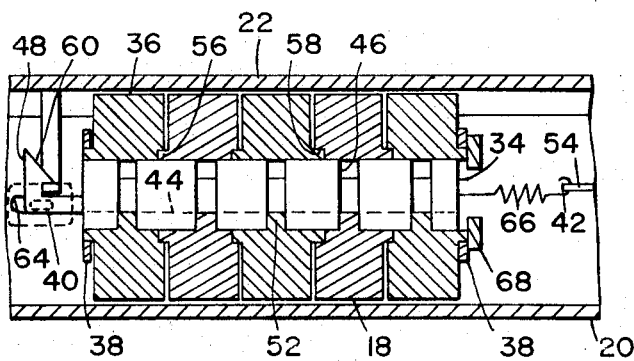
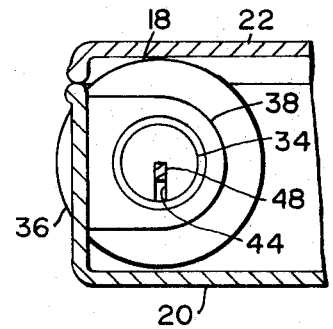

KEY CASE

BACKGROUND OF THE INVENTION

1. Field of the Invention

The invention relates to key cases and refers more specifically to a key case for and a method of use of the key case for preventing use of an automobile by a person whose faculties are impaired.

2. Description of the Prior Art

Key cases have been known in the past wherein keys secured to the key case can extend inside or outside of the key case for storage and use, respectively. Also, it has been known in the recent past to provide automobiles with structure to prevent completion of the ignition circuit by persons having faculties impaired to the point wherein they have been unable to punch a predetermined combination on punch keys or to follow an irregular sensitized path with a stylus or the like.

The key cases of the past have provided no means for preventing ready access to vehicle keys by a person whose faculties are impaired. Further, the structures placed in automobiles for preventing completion of the ignition circuit of the automobiles by persons whose faculties have been impaired have been complicated and therefore have been subject to malfunction and have been expensive, whereby such structures have not been readily acceptable to the motoring public.

SUMMARY OF THE INVENTION

In accordance with the present invention, a key case is provided including means for placing keys secured to the key case either inside of the case or outside of the case alternatively. The key case of the invention also includes a combination lock for locking the key case with the keys in either position. Thus, in use, when the holder of the key case realizes that his faculties may become impaired, he can place his automobile keys in the case and lock the case, with the result that when his faculties do become impaired to the point where he is unable to dial the combination of the case, he will be unable to obtain the keys and therefore unable to drive his automobile.

BRIEF DESCRIPTION OF THE DRAWINGS

FIG. 1 is a perspective view of the key case of the invention.

FIG. 2 is an enlarged plan view of the inside of the key case of FIG. 1 with the key case open and keys shown therein extending both into and out of the case.

FIG. 3 is an enlarged longitudinal section view of the combination lock structure of the key case shown in FIGS. 1 and 2, taken substantially on the line 3—3 in FIG. 2 and including associated portions of the key case.

FIG. 4 is a cross section view of the lock structure illustrated in FIG. 3, taken substantially on the line 4—4 in FIG. 3.

DESCRIPTION OF THE PREFERRED EMBODIMENTS

As shown in FIG. 1, the key case 10 includes an enclosure 12, means 14 for securing keys 16 to the case 10 with the keys 16 extending either within or outside of the enclosure 12, and a multiple-digit combination lock structure 18.

In more detail, the enclosure 12 includes a body part 20 and a cover 22 made of rigid material such as stamped metal or molded plastic, either of which may be covered with a plurality of well-known decorative finishes which will not be considered in detail. The cover 22 is secured to the body 20 by the hinge 24.

The body 20 and cover 22 have the recesses 26 and 28 therein, respectively. The means 14 for securing keys 16 to the case 12 is secured within the recess 26 by convenient means such as rivets or an adhesive or the like, not shown. The recesses 26 and 28 are operable together when the cover 22 is closed on the body 20 to provide a slot in the enclosure 12 at one end thereof through which selected keys 16 may extend when the enclosure 12 is closed.

The structure 14 for receiving keys 16 within the key case 10 may again be any of a plurality of known structures and as shown includes a base member 30 to which eyelets 32 are secured. The keys 16 are secured to individual eyelets 32 on the key clips 34 which are attached to the eyelets 32, as shown.

It will, of course, be obvious that other key-retaining structures may be secured in the key case 10 which may also be of such nature as to permit individual removal of keys from the key case. Those structures which function best in the present key case permit alternate positioning of the keys 16 so that the keys either extend out of the key case through the slot formed by the recesses 26 and 28 with the key case closed or extend within the key case, as shown particularly in FIG. 2.

The combination lock structure 18, as best shown in FIGS. 3 and 4, includes a locking cylinder 34, a plurality of multiple-digit discs 36, brackets 38 for supporting the cylinder 34 and discs 36 for rotation from the body 20 of the enclosure 12, means 40 for locking the cover 22 in a closed position on the body 20 of the enclosure 12, and means 42 for urging the cylinder 34 into a locking position.

In more detail, the cylinder 34 has a longitudinally extending slot 44 therein and a plurality of axially spaced apart annular grooves 46. The locking means 40 includes a hook 48 which is secured to one end of the locking cylinder 34, while the means 42 for urging the locking cylinder into a locking position includes a spring 66 secured to the other end of the locking cylinder 34, as shown best in FIG. 3.

The plurality of multiple-digit discs 36 include circumferentially positioned digits from zero through nine around the circumference thereof, which on rotation of the discs 36 may be lined up with a position indicator line 50 on the enclosure body, as shown best in FIG. 1. The discs 36, as shown, are annular and are positioned over the locking cylinder 34. The discs 36 each have a finger portion 52 extending radially inwardly of the inner circumference thereof, which finger portions 52 are of an angular extent equal to the width of the slot 44 in the locking cylinder 34 and are of an axial extent equal to the axial extent of the grooves 46 in the locking cylinder 34.

Thus, the locking cylinder 34 is movable axially relative to the discs 36 only when all of the discs 36 are rotated into a position wherein the fingers 52 are aligned with the slot 44 in the locking cylinder 34. Rotation of the discs 36 can, of course, only be accomplished when the discs 36 are positioned axially of the cylinder 34 so that the fingers 52 are positioned within the grooves 46 in the locking cylinder 34.

The discs 36 are supported at their ends by the supporting brackets 38 at the opposite ends of the locking cylinder 34. The discs 36 are provided with annular mating recesses 56 and annular ribs 58, as shown, for proper guiding and rotation of the discs on the locking cylinder 34, as shown best in FIG. 3.

The means 40 for locking the cover closed, besides including the hook 48 on the locking cylinder 34, includes a locking abutment 58 which as shown is generally U-shaped and is secured to the cover 22 of the enclosure 12 so as to engage the inclined plane camming portion 60 of the hook 48 on closing of the cover 22.

Thus, on closing of the cover 22 with the fingers 52 in the slot 44, the locking cylinder 34 is cammed to the right in FIG. 3 until the hook 48 passes over the abutment 58 at which time it is urged to the left in FIG. 3 by the spring 66 to cause the hook 48 to engage the abutment 58 and prevent opening of the key case 10.

The cylinder 34 is manually moved to the right again in opposition to the means 42 urging the cylinder 34 to the left or into a locking position, as shown in FIG. 3 when it is desired to open the key case 10. With the key case unlocked, manual movement of the cylinder 34 to the right may be accomplished by movement of the slide 62 on the body of the enclosure 12. The slide extends through a slot 64 in the body 20 of the enclosure 12 and is rigidly secured to the hook 48 for movement therewith.

The means 42 for urging the cylinder 34 into a locking position, as shown best in FIG. 3, includes a spring 66 secured at one end to the locking cylinder 34 and secured at the other end to the post 54 secured to the body 20 of the enclosure 12. The abutment 68 also secured to the body 20 is also part of the means for urging the locking cylinder 34 into a locked position. Thus, when the slide 62 is released, the cylinder 34 is moved into engagement with the abutment 68 by the spring 66 to align the fingers 52 with the grooves 46 to permit rotation of discs 36.

In overall use of the key case 10, when the owner of an automobile having the key case which may include, for example, house keys and automobile keys, realizes that his faculties may be impaired as, for example, by a night on the town in which drinking intoxicating liquors is anticipated, or when the taking of drugs or hallucinogenics, or even medicines which may impair driving ability, are going to be used, the house keys and the like which it is desired to have available at all times are placed outside the enclosure 12, while the automobile keys are positioned inside the enclosure 12, as shown best in FIG. 2. The discs 36 are rotated so that they are in the opening combination, and the cover 22 is closed on the body 20 of the enclosure 12, whereon the hook 48 secured to the cylinder 34 is caused to cam over the locking abutment 58 and to return to the locking position against the abutment 68, as shown in FIG. 4, due to the bias of the spring 66 secured to the cylinder 34. The discs 36 are then rotated to remove the opening combination therefrom. The automobile keys are thus securely locked within the enclosure 12.

As the ability to drive of the holder of the key case becomes impaired, the holder of the key case will be permitted to open the key case 10 to get to the automobile keys to drive the automobile only so long as his faculties are not impaired sufficiently to prevent him from dialing the combination of the lock. If the lock combination is correctly dialed when it is desired to drive, the fingers of the discs 36 will align with the slot 44 so that on movement of the slide 62, the cylinder 34 will be moved longitudinally against the bias of the spring 66 to permit opening of the cover 22 of the enclosure 12. The keys may then be used by the holder of the key case to drive the automobile in the usual manner.

If, however, the ability to function is sufficiently impaired so that the proper combination cannot be dialed on the lock structure 18, the keys will be securely locked in the enclosure 12 and driving of the vehicle with which the keys are associated will be prevented. Thus, accidents caused by drivers who are heavily medicated, inebriated, or whose driving ability is impaired due to the use of drugs, should be reduced.

While one embodiment of the invention in key cases has been disclosed in detail, it will be understood that other embodiments and modifications thereof are contemplated. It is the intention to include all such embodiments and modifications thereof as are defined by the appended claims within the scope of the invention.

What I claim as my invention is:

1. A key case comprising an enclosure including a cover and a body, means for securing at least one key to the key case in alternative positions extending into or out of the enclosure, and a multiple-digit combination lock on the enclosure for locking the enclosure closed with the key on the inside of the enclosure including a locking cylinder having a longitudinally extending slot therein and a plurality of circumferentially extending grooves in spaced relation along the length thereof and a plurality of annular discs supported on the body of the enclosure positioned in side by side relation over the length of the cylinder having finger portions extending into a slot in the locking cylinder and movable in predetermined grooves in the locking cylinder when the discs are in predetermined longitudinal positions on the locking cylinder to permit rotation of the discs on the locking cylinder, whereby the locking cylinder is movable longitudinally of the discs with all of the discs in only one predetermined angular position on the locking cylinder, means for locking the cover of the enclosure with the locking cylinder in one predetermined position operable between the locking cylinder and the cover, and means for urging the locking cylinder into the one predetermined position operable between the body of the enclosure and the locking cylinder whereby with an automobile key positioned within the enclosure on the key securing means and the enclosure closed and locked, use of the key to start an automobile by a person whose faculties are impaired to the point where they are unable to open the combination lock and should therefore not be driving an automobile, is prevented.

2. A key case, means for retaining at least one key within the key case and a multiple-digit combination lock on the case for locking the case with the key in the case including a locking cylinder having a longitudinally extending slot therein and a plurality of circumferentially extending grooves in spaced relation along the length thereof and a plurality of annular discs supported on the body of the enclosure positioned in side by side relation over the length of the cylinder having finger portions extending into a slot in the locking cylinder and movable in predetermined grooves in the locking cylinder when the discs are in predetermined longitudinal positions on the locking cylinder to permit rotation of the discs on the locking cylinder, whereby the locking cylinder is movable longitudinally of the discs with all of the discs in only one predetermined angular position on the locking cylinder whereby with an automobile key positioned within the case use of the key to start an automobile by a person whose faculties are impaired to the point where they are unable to open the combination lock and should therefore not be driving an automobile, is prevented.

3. Structure as set forth in claim 2 and further including means for locking the case closed with the locking cylinder in one predetermined position.

4. Structure as set forth in claim 3 and further including means for urging the locking cylinder into the one predetermined position operable between the case and the locking cylinder.

5. Structure as set forth in claim 1 wherein the plurality of discs include axially extending mating annular ribs and recesses whereby the discs are guided in rotation in side by side relation on the locking cylinder.

6. Structure as set forth in claim 1 wherein the means for locking the cover with the locking cylinder in one predetermined position comprises a rigid U-shaped member secured to the cover and a hook secured to the locking cylinder having an inclined plane surface thereon, which inclined plane surface is engaged by the U-shaped member on the cover on closing of the cover to cam the hook into locking engagement with the U-shaped member in opposition to the means for urging the locking cylinder into the one predetermined position.

7. Structure as set forth in claim 1 wherein the means for urging the locking cylinder into the one predetermined position comprises resilient means secured to the body portion of the enclosure at one end and to the locking cylinder at the other end, and abutment means secured to the body of the enclosure for limiting the movement of the locking cylinder due to the urging of the resilient means.

* * * * *